(12) United States Patent
Kim

(10) Patent No.: US 6,364,405 B1
(45) Date of Patent: Apr. 2, 2002

(54) REAR END CROSS MEMBER REINFORCEMENT STRUCTURE OF AUTOMOBILE

(75) Inventor: Byung-Jin Kim, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/672,580

(22) Filed: Sep. 28, 2000

(30) Foreign Application Priority Data

Dec. 31, 1999 (KR) .............................. 99-68311

(51) Int. Cl.⁷ .................................................. B60J 7/00
(52) U.S. Cl. ............. 296/203.04; 296/195; 296/203.01; 296/29
(58) Field of Search ........................... 296/203.04, 195, 296/203.01, 29

(56) References Cited

U.S. PATENT DOCUMENTS

| | | | | | |
|---|---|---|---|---|---|
| 4,717,197 | A | * | 1/1988 | Harasaki | 296/202 |
| 4,804,222 | A | * | 2/1989 | Sakiyama et al. | 296/203 |
| 4,875,733 | A | * | 10/1989 | Chando | 296/203 |
| 4,950,025 | A | * | 8/1990 | Yoshi | 296/195 |
| 4,968,087 | A | * | 11/1990 | Goria | 296/203 |
| 4,973,103 | A | * | 11/1990 | Imajyo et al. | 206/203 |
| 4,982,994 | A | * | 1/1991 | Sekiguchi | 296/203 |
| 5,246,263 | A | * | 9/1993 | Tanaka | 296/195 |
| 5,782,525 | A | * | 7/1998 | Honma et al. | 296/203 |
| 5,855,407 | A | * | 1/1999 | Fukuda | 296/203.03 |
| 6,073,992 | A | * | 6/2000 | Yamauchi et al. | 296/203.01 |
| 6,209,949 | B1 | * | 4/2001 | Sakayo et al. | 296/203.03 |
| 6,254,174 | B1 | * | 7/2001 | Wee | 296/203.03 |

FOREIGN PATENT DOCUMENTS

| | | | |
|---|---|---|---|
| JP | 61 161175 | * | 1/1986 |
| JP | 61 226370 | * | 10/1986 |
| JP | 63 219489 | * | 9/1988 |
| JP | 63 222980 | * | 9/1988 |
| JP | 1 244983 | * | 9/1989 |
| JP | 5 278633 | * | 10/1993 |
| JP | 6 1262 | * | 1/1994 |

* cited by examiner

Primary Examiner—Joseph D. Pape
Assistant Examiner—Kiran B. Patel
(74) Attorney, Agent, or Firm—Christie, Parker & Hale, LLP

(57) ABSTRACT

A rear end cross member reinforcement structure of automobile constructed to have respective members forming a rear end cross member join together to form a closed cross-sectional shape such that an external force applied from outside can be effectively diffused, and to have a structure at a joined portion between both tip end portions of the rear end cross member and a quarter panel changed to reinforce a structural strength relative to the rear end cross member, such that the rear end cross member can fully withstand an external force when the external force such as torsion or the like is applied thereto, the rear end cross member reinforcement structure of automobile having a rear body including a rear end cross member arranged crosswise of the body and a quarter panel joining both tip end portions of the rear end cross member, wherein each tip end of an upper rear end cross member, a lower rear end cross member and an outer rear end cross member which form the rear end cross member is joined together to form a closed cross-sectional shape and both tip end portions of the rear end cross member is joined by the quarter panel to form another closed cross-sectional shape.

2 Claims, 5 Drawing Sheets

REAR END CROSS MEMBER REINFORCEMENT STRUCTURE OF AUTOMOBILE

BACKGROUND OF THE INVENTION

1. FIELD OF THE INVENTION

The present invention relates to a rear end cross member of automobile, and more particularly to a rear end cross member reinforcement structure of automobile constructed to reinforce a structural strength to a joint area between both tip end portions of rear end cross member and a quarter panel to enable to fully withstand an external force even if the external force such as distortion or the like is applied thereto.

2. DESCRIPTION OF THE PRIOR ART

Generally, an automobile is composed of a body and a chassis, where the body comprising an external appearance of the automobile includes a plurality of various shapes of members, each appropriately combined therebetween. A rear body of an automobile equipped with a tailgate (T) at a rear end thereof includes a rear end cross member 10 and a quadrant panel 12 (hereinafter referred to as quarter panel) joining both tip end portions of the rear end cross member 10, where a joined portion between the rear end cross member 10 and the quarter panel 12 is illustrated in FIG. 2 showing "P" portion in FIG. 1.

As illustrated in FIG. 3 showing a sectional view taken along line A—A, the rear end cross member 10 is constructed to form a closed section by an upper rear end cross member 10a, a lower rear end cross member 10b and an outer rear end cross member 10c, where both tip end portion of the rear end cross member 10 are joined by the quarter panel 12 as shown in FIG. 4 illustrating a sectional view taken along line B—B. The quarter panel 12 is constructed to include an inner lower quarter panel 12a joining a tip end portion of the lower rear end cross member 10b and an outer quarter panel 12b joining a tip end portion of the outer rear end cross member 10c.

Furthermore, as illustrated in FIG. 5 for showing a sectional view taken along line C—C of FIG. 3, the quarter panel 12 further includes an inner lower quarter extension panel 12c joining a tip end portion of the upper rear end cross member 10a and an inner quarter panel 12d joining a tip end portion of the inner lower quarter extension panel 12c, where a tip end of the lower rear end cross member 10b at the rear end cross member 10 is joined by the inner lower quarter panel 12a and a tip end portion of the inner lower quarter panel 12a is joined by the outer quarter panel 12b.

Meanwhile, the rear end cross member 10 is joined by side members 14, each member being lengthwise arranged along the body of the automobile at left and right side thereof.

However, there is a drawback in the rear portion of the body of the automobile comprising the quarter panel 12 joined by both tip end portions of the rear end cross member 10 and the rear end cross member 10 thus constructed according to the prior art in that the tip end portion of the inner lower quarter panel 12a of the rear end cross member 10 is directly joined by the inner lower quarter extension panel 12c of the quarter panel 12, such that, when an external force such as torsion or the like is applied to the joined portion between the rear end cross member 10 and the quarter panel 12, a crack or deformation can occur at the joined portion, thereby causing a structural problem of weakening a corner portion of the rear body.

Still worse, there is another drawback in that the weakened structural strength at the joined portion between the rear end cross member 10 and the quarter panel 12 causes the corner portion of the rear body to be twisted, thereby making it difficult to open and close the tailgate (T) when one wheel is placed on a non-planar location such as a hilly spot or the like.

SUMMARY OF THE INVENTION

The present invention is disclosed to solve the aforementioned problems and it is an object of the present invention to provide a rear end cross member reinforcement structure of automobile constructed to have respective members forming a rear end cross member join together to form a closed cross-sectional shape such that an external force applied from outside can be effectively diffused, and to have a structure at a joined portion between both tip end portions of the rear end cross member and a quarter panel changed to reinforce a structural strength relative to the rear end cross member, such that the rear end cross member can fully withstand an external force when the external force such as torsion or the like is applied thereto.

In accordance with the objects of the present invention, there is provided a rear end cross member reinforcement structure of automobile having a rear body including a rear end cross member arranged crosswise of the body and a quarter panel joining both tip end portions of the rear end cross member, wherein each tip end of an upper rear end cross member, a lower rear end cross member and an outer rear end cross member which form the rear end cross member is joined together to form a closed cross-sectional shape and both tip end portions of the rear end cross member is joined by the quarter panel to form another closed cross-sectional shape.

BRIEF DESCRIPTION OF THE DRAWINGS

For fuller understanding of the nature and object of the invention, reference should be made to the following detailed description taken in conjunction with the accompanying drawings in which.

DETAILED DESCRIPTION OF THE INVENTION

Preferred embodiment of the present invention will now described in detail with reference to the accompanying drawings.

Figure 1:
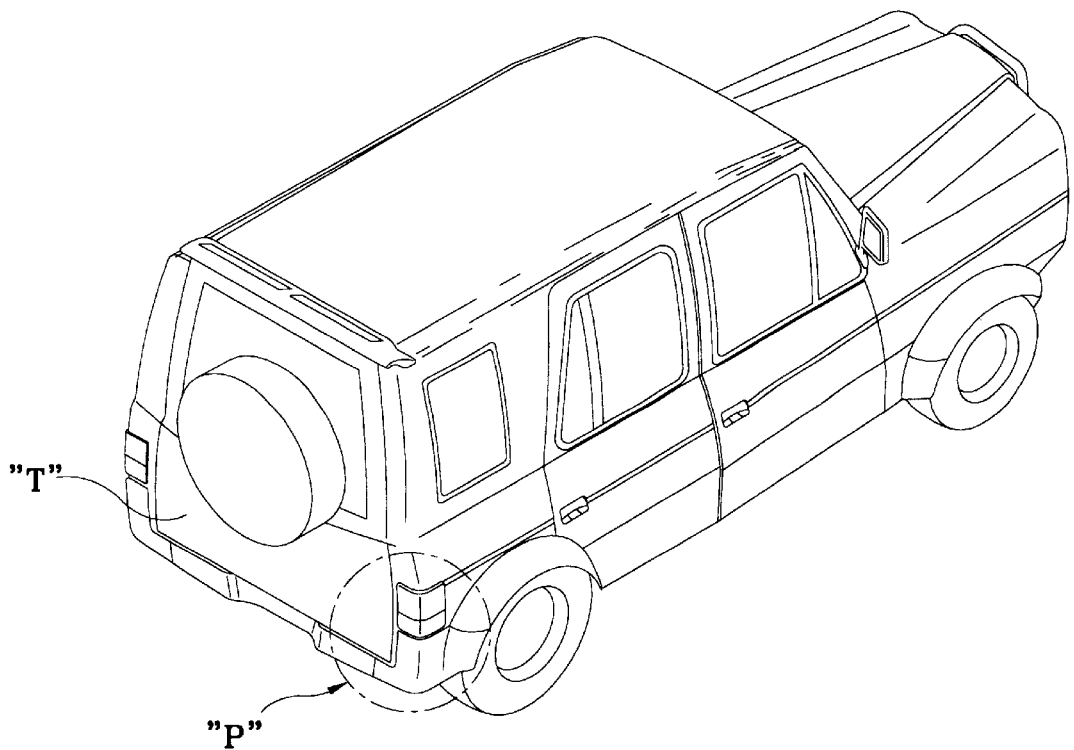
FIG. 1 is a schematic perspective view for illustrating a rear body of an automobile having a tailgate according to the prior art.
Figure 2:
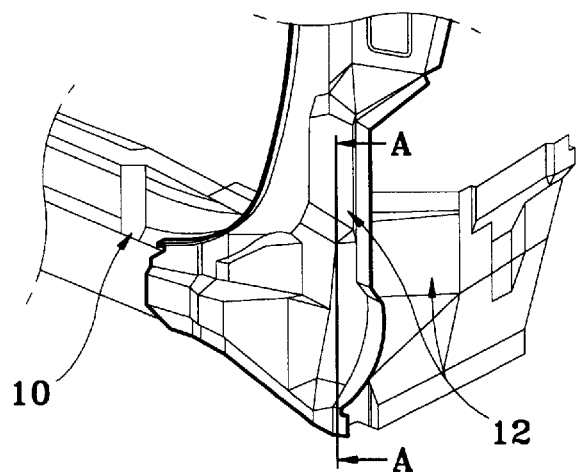
FIG. 2 is a schematic perspective view for illustrating an interior of a body corresponding to "P" portion of FIG. 1.
Figure 3:
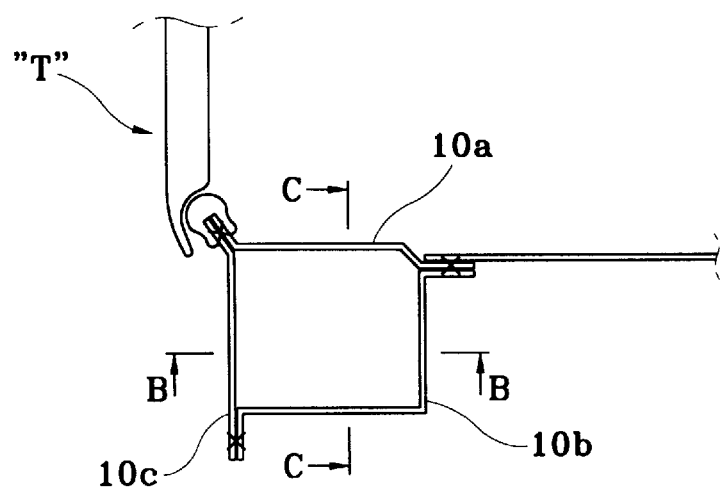
FIG. 3 is a sectional view taken along line A—A of FIG. 2.
Figure 4:
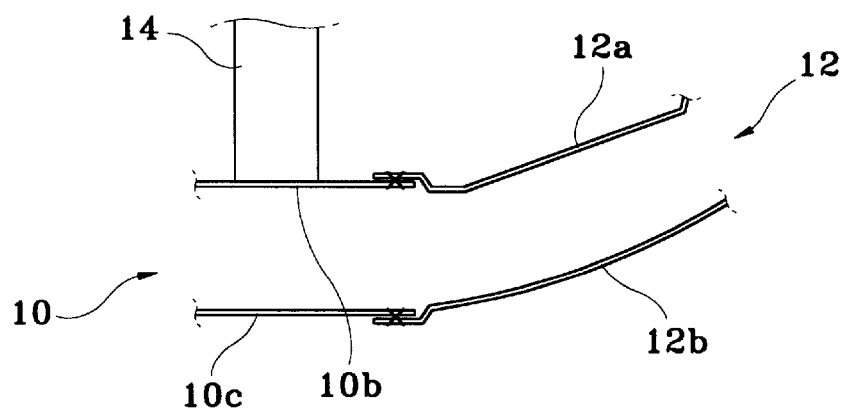
FIG. 4 is a sectional view taken along line B—B of FIG. 3.
Figure 5:
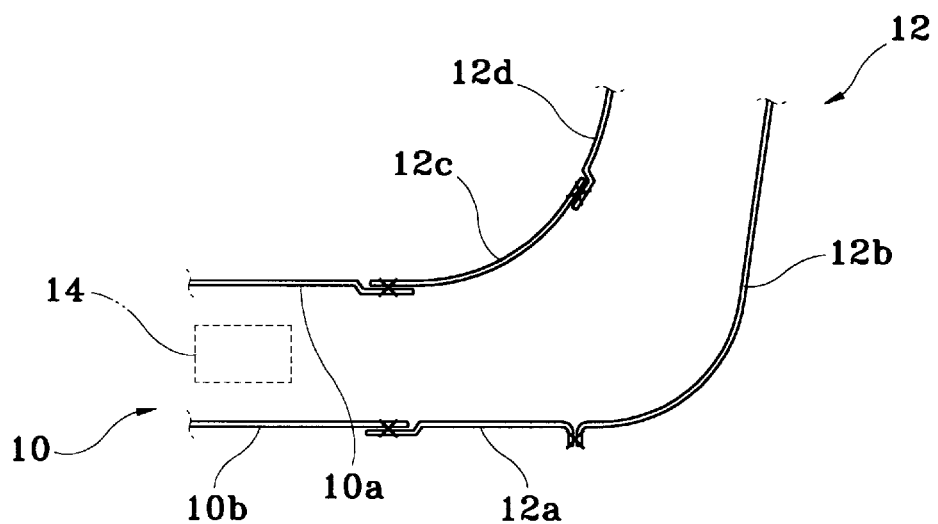
FIG. 5 is a sectional view taken along line C—C of FIG. 3.
Figure 6:
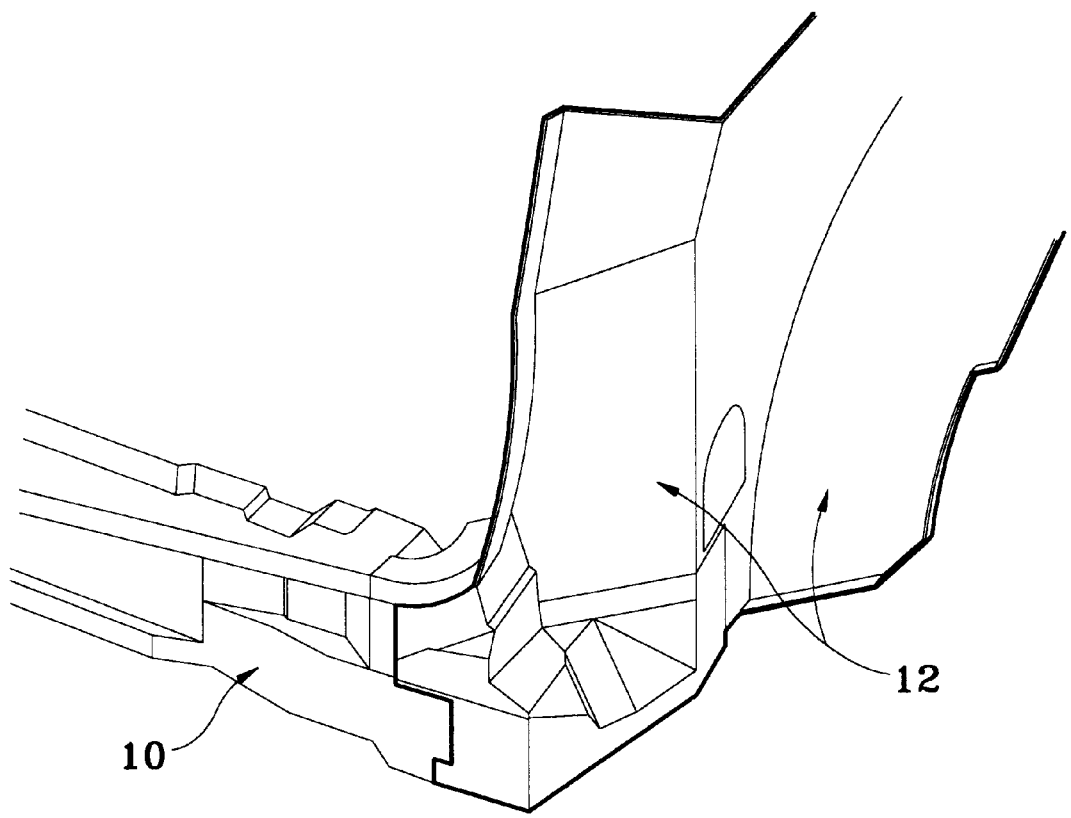
FIG. 6 is a schematic perspective view for illustrating a rear body of an automobile according to the present invention.
Figure 7:
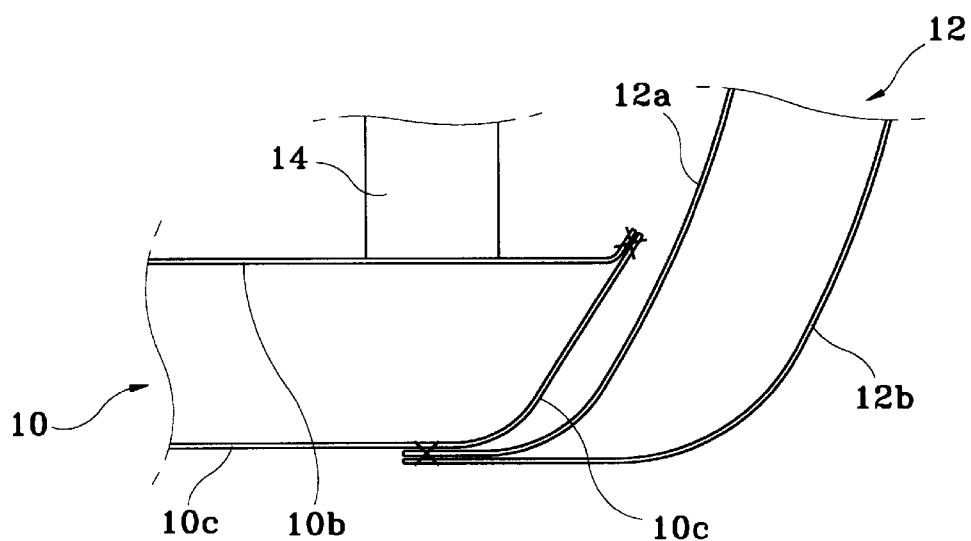
FIG. 7 is a sectional view corresponding to FIG. 4.
Figure 8:
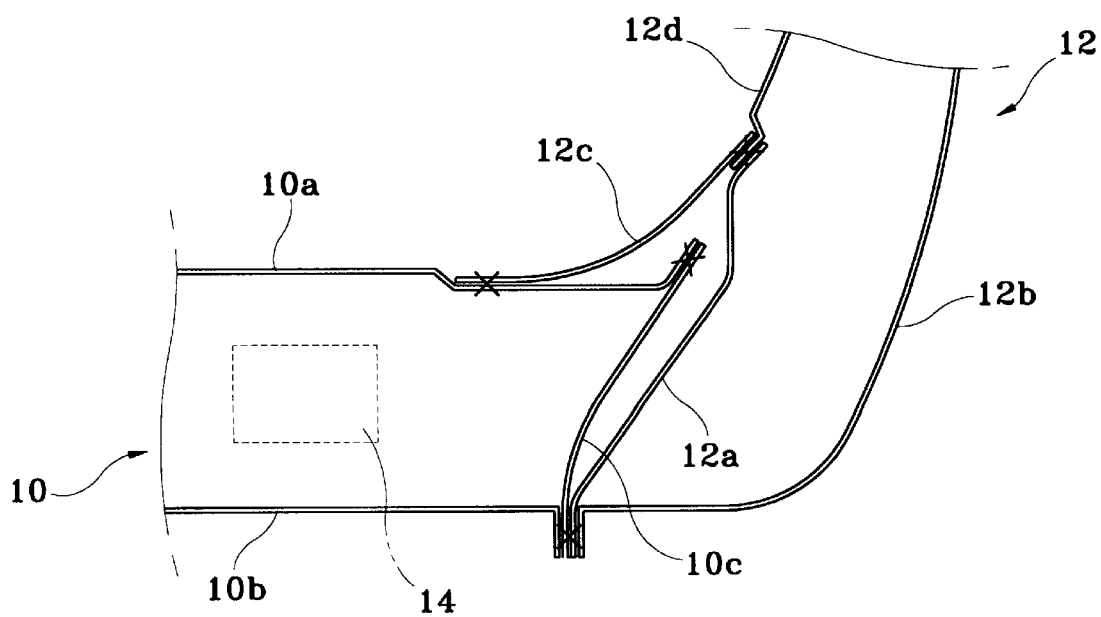
FIG. 8 is a sectional view corresponding to FIG. 5.

FIG. 6 is a schematic perspective view for illustrating a rear body of an automobile according to the present invention, FIG. 7 is a sectional view corresponding to FIG. 4 and FIG. 8 is a sectional view corresponding to FIG. 5, where like reference numerals are designated for like or equivalent parts or portions as in FIGS. 2, 3, 4 and 5 for illustrating a joined portion between a rear end cross member and a quarter panel according to the prior art.

As illustrated in the drawings, a rear body of the automobile having a tailgate (T) openably and closeably mounted thereat includes a rear end cross member 10 crosswise arranged lengthily and a quarter panel 12 joining both tip end portions of the rear end cross member 10, where the rear end cross member 10 is constructed to form a closed cross-sectional shape by joining an upper rear end cross member 10a, a lower rear end cross member 10b and an outer rear end cross member 10c. At this location, a cross section of the joined portion between the rear end cross member 10 and the quarter panel 12 has a construction as shown in FIG. 7.

In other words, a tip end portion of the rear end cross member 10 is structured to form a closed cross-sectional shape, for which, tip end portions of the lower rear end cross member 10b and the outer rear end cross member 10c are mutually combined, and the outer rear end cross member 10c is joined at a tip end portion thereof by an inner lower quarter panel 12a of the quarter panel 12 and a tip end of an outer quarter panel 12b by way of 3-point welding.

Meanwhile, a longitudinal section relative to a joint portion between the rear end cross member 10 and the quarter panel 12 is illustrated in FIG. 8, where a tip end portion of the rear end cross member 10 is made to form a closed cross-sectional shape, for which, a tip end portion of the upper rear end cross member 10a and a tip end portion of the lower rear end cross member 10b are joined by both tip end portions of the outer rear end cross member 10c.

Furthermore, a combined portion between the lower rear end cross member 10b and the outer rear end cross member 10c are joined by the inner lower quarter panel 12a of the quarter panel 12 and a tip end portion of the outer quarter panel 12b by way of 4-point welding. Still furthermore, the inner lower quarter panel 12a is joined at the other tip end portion thereof by an inner quarter panel 12d, and a joint portion between the inner lower quarter panel 12a and the inner quarter panel 12d is joined by a tip end portion of an inner lower quarter extension panel 12c by way of a 3-point welding. The inner lower quarter extension panel 12c is joined at the other tip end portion thereof by a tip end portion of the upper rear end cross member 10a of the rear end cross member by way of 2-point welding.

The rear end cross member 10 is joined by side members 14, each member being lengthwise arranged along the body of the automobile at left and right side thereof.

The rear end cross member 10 therefore forms a cross-sectional shape at both tip end portions thereof, and particularly, a joined portion between the lower rear end cross member 10b of the rear end cross member 10 and the outer rear end cross member 10c is joined by the inner lower quarter panel 12a of the quarter panel 12 to form a cross-sectional shape along with the outer quarter panel 12b, such that a structural strength relative to the joined portion between the rear end cross member 10 and the quarter panel 12 is further reinforced and at the same time, an external force or shock applied from outside can be evenly dispersed through respective members of the rear end cross member 10.

Furthermore, the inner lower quarter extension panel 12c joined to form another closed cross-sectional shape between the upper rear end cross member 10a of the rear end cross member 10 and the inner quarter panel 12d of the quarter panel 12 also increase a joined structural strength between the rear end cross member 10 and the quarter panel 12.

Consequently, when the rear end cross member 10 and the quarter panel 12 at the rear body of the automobile are joined according to the construction thus described, a crack occurring at the joined portion or deformation of members caused thereby can be decreased, leading to a reinforced structural strength to a corner portion at the rear body of the automobile.

The reinforced structural strength at the joined portion between the rear end cross member 10 and the quarter panel 12 thus described causes a less twist to the corner portion of the rear body when one wheel is placed on a non-planar location such as a curve or the like, thereby enabling to smoothly open and close the tailgate (T).

As apparent from the foregoing, there is an advantage in the rear end cross member reinforcement structure of automobile thus described according to the present invention in that both tip end portions of the rear end cross member 10 are joined to form a closed cross-sectional shape in the rear body comprising the rear end cross member 10 and the quarter panel joining both tip end portions of the rear end cross member 10 and other respective members of the quarter panel 12 are also joined on the joined portion to form another closed cross-sectional shape, such that a structural strength relative to the joined portion between the rear end cross member 10 and the quarter panel 10 is further increased to reduce the deformation of the body even if an external shock such as torsion or twist is applied to the rear end cross member 10.

What is claimed is:

1. A rear end cross member reinforcement structure of an automobile having a rear body including a rear end cross member arranged crosswise of the body and a quarter panel joining both tip end portions of the rear end cross member, wherein each tip end of an upper rear end cross member, a lower rear end cross member and an outer rear end cross member which form the rear end cross member is joined together to form a closed cross-sectional shape and both tip end portions of the rear end cross member is joined by the quarter panel to form another closed cross-sectional shape.

2. The structure as defined in claim 1, wherein a joined portion between the lower rear end cross member of the rear end cross member and the outer rear end cross member is joined by each tip end portion of an inner lower quarter panel and an outer quarter panel of the quarter panel, and the inner lower quarter panel is respectively joined by the other tip end of an inner lower quarter extension panel joined by a tip end of the upper rear end cross member and a tip end of an inner quarter panel.

* * * * *